(12) United States Patent
Arancibia Reyes

(10) Patent No.: US 12,471,543 B2
(45) Date of Patent: Nov. 18, 2025

(54) CONTINUOUS, INTEGRAL AND AUTOMATIC PROCEDURE OR METHOD FOR PRODUCING AND MANUFACTURING A LAYER, COVER, MAT AND/OR FILM AS A SINGLE PART MADE OF POLYETHYLENE AND/OR PLASTIC THAT IS JOINED, ATTACHED AND/OR INTEGRATED WITH AN ELEMENT FOR DELIVERING, DISTRIBUTING AND/OR REMOVING FLUID, WITH BASIC STEPS FOR CONTINUOUS AND AUTOMATIC FEEDING

(71) Applicants: AVANZA INVERSIONES SPA, Santiago (CL); ANAREP SPA, Santiago (CL)

(72) Inventor: Alexis Marcelo Arancibia Reyes, Santiago (CL)

(73) Assignee: WATER SAVE TECHNOLOGY SPA, Santiago (CL)

( * ) Notice: Subject to any disclaimer, the term of this patent is extended or adjusted under 35 U.S.C. 154(b) by 62 days.

(21) Appl. No.: 18/555,585

(22) PCT Filed: Apr. 21, 2022

(86) PCT No.: PCT/CL2022/050036
§ 371 (c)(1),
(2) Date: Oct. 16, 2023

(87) PCT Pub. No.: WO2022/221966
PCT Pub. Date: Oct. 27, 2022

(65) Prior Publication Data
US 2024/0407310 A1 Dec. 12, 2024

(30) Foreign Application Priority Data
Apr. 21, 2021 (CL) .................. 1002-2021

(51) Int. Cl.
A01G 25/02 (2006.01)
B29C 65/20 (2006.01)

(52) U.S. Cl.
CPC .............. *A01G 25/02* (2013.01); *B29C 65/20* (2013.01)

(58) Field of Classification Search
CPC ........ A01G 13/00; A01G 13/20; A01G 25/00; A01G 25/02; B29C 65/02; B29C 65/18;
(Continued)

(56) References Cited

U.S. PATENT DOCUMENTS 5,591,293 A * 1/1997 Miller ................... B29C 48/157
156/218
6,996,932 B2 * 2/2006 Kruer ..................... A01G 13/31
47/21.1
(Continued)

FOREIGN PATENT DOCUMENTS

DE 4408556 9/1994
JP S5440142 3/1979
(Continued)

*Primary Examiner* — Philip C Tucker
*Assistant Examiner* — Brian R Slawski
(74) *Attorney, Agent, or Firm* — FisherBroyles, LLP; Jason P. Mueller

(57) ABSTRACT

The present invention relates to an automatic integrated continuous procedure for the one-piece production and manufacturing of at least one layer, cover, mat and/or film of polyethylene and/or plastic material attached, fastened and/or integrated with at least one element for the delivery, distribution and/or removal of fluid, comprising the steps of feeding a film, layer, cover and/or mat of polyethylene and/or plastic unfolded toward a thermofusion unit comprising drag idlers whereby the film, layer, mat and/or cover passes, where high-temperature silicone wheels are arranged above said drag idlers, so that when they touch said idlers together they become the dragging means of the film, layer, (Continued)

cover and/or mat which are arranged between said idlers and silicone wheels, feeding a film sleeve to be arranged and/or placed over the irrigation line already deployed over the film, layer, cover and/or mat arranged between said idlers and silicone wheels, and thermofusing the peripheral edges of said film sleeve that are arranged or placed over the film, layer, cover and/or mat, producing the coupling of the film sleeve with the film, layer, cover and/or mat fusing them together in conjunction with the pressure produced by the silicone wheels welding the two plastics, ensuring that the element for the delivery, distribution and/or removal of fluid is not thermofused with the fused plastics, remaining attached, fastened and/or arranged between the film sleeve and the film, layer, cover and/or mat.

17 Claims, 1 Drawing Sheet

(58) Field of Classification Search
CPC ..... B29C 65/20; B29C 65/78; B29C 66/1122; B29C 66/43; B29C 66/4722; B29C 66/71; B29C 66/723; B29C 66/729; B29C 66/83413; B29C 66/8362; C22B 3/02

USPC ......... 156/60, 65, 70, 91, 92, 157, 184, 185, 156/187, 191, 192, 290, 292, 297, 299, 156/300, 301, 302, 308.2, 308.4, 309.6, 156/324; 47/21.1, 48.5; 239/547

See application file for complete search history.

(56) References Cited

U.S. PATENT DOCUMENTS

| 6,997,402 B2* | 2/2006 | Kruer ...................... A01G 13/31 |
| | | 156/203 |
| 2007/0144065 A1 | 6/2007 | Lowe |
| 2008/0072480 A1* | 3/2008 | McGrady ............... A01G 13/32 |
| | | 47/21.1 |
| 2008/0282609 A1* | 11/2008 | Nelson ................... A01G 13/32 |
| | | 47/48.5 |

FOREIGN PATENT DOCUMENTS

| KR | 102156566 | 9/2020 |
| KR | 102156566 B1 | 9/2020 |
| KR | 102162295 | 10/2020 |
| WO | 2013107954 | 7/2013 |
| WO | 2019028563 | 2/2019 |

* cited by examiner

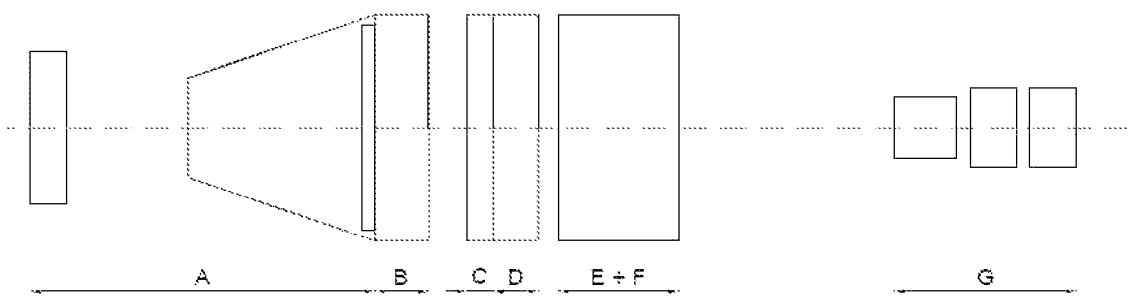

CONTINUOUS, INTEGRAL AND AUTOMATIC PROCEDURE OR METHOD FOR PRODUCING AND MANUFACTURING A LAYER, COVER, MAT AND/OR FILM AS A SINGLE PART MADE OF POLYETHYLENE AND/OR PLASTIC THAT IS JOINED, ATTACHED AND/OR INTEGRATED WITH AN ELEMENT FOR DELIVERING, DISTRIBUTING AND/OR REMOVING FLUID, WITH BASIC STEPS FOR CONTINUOUS AND AUTOMATIC FEEDING

CROSS REFERENCE

This application is a national stage entry application under 35 U.S.C. 371 of PCT Patent Application No. PCT/CL2022/050036, filed Apr. 21, 2022, which claims priority to Chilean Patent Application No. 1002-2021 filed Apr. 21, 2021, the entire contents of each of which are incorporated herein by reference.

FIELD OF INVENTION

The present invention refers to a procedure for the automated continuous manufacture and/or production of at least one film, cover, mantle and/or mesh made of polyethylene material, plastic, among other materials, comprising at least one fluid distribution line in an integrated manner, so that the manufactured product allows both components to be deployed at the same time, without the need to be deployed on the ground separately. Preferably, the invention refers to a procedure that allows the integrated continuous formation of at least one film, mantle, cover and/or mesh with at least one drip irrigation line to be used in the mining industry, such as to cover leaching piles and/or in the agriculture industry to cover cultivated areas.

BACKGROUND OF THE INVENTION

In the present art, films or covers of the surface to be leached have been used, which are arranged on top of the irrigation mesh, so as to cover the upper surface of the leaching pile with said cover and thus avoiding evaporation of the leaching solution, as well as increasing the temperature of the leaching pile increasing the conditions for the proliferation of bacteria in bio-leaching procedures. Notwithstanding the foregoing, these solutions have produced a great advantage in managing the evaporation parameters of the leaching solution decreasing the water usage rate and leaching agents, as well as increasing the temperature of the leaching pile, the arrangement operation of said films on the upper surface of the leaching pile is labor-intensive, as well as the time required for their arrangement and fixation, so that said films or covers of the leach pile surface are not affected or dragged by the wind action.

Another field in which land surface covers are used is in the agriculture area where the relationship between plastics and agriculture is so close that it has given rise to plasticulture or agro-plasticulture, which involves the use of polymers in the agricultural production through padding of soils, irrigation system, meshes, tunnels, greenhouse and/or covers, which allow early harvests, growing fruits out of season, weeds and insects control, as well as improving efficiency in the use of water, in the use of fertilizers and in the use of the soil itself. The use of paddings or mats to cover the soil surface in agricultural production is a procedure and production system that is increasing worldwide. Traditionally, these mats are formed by a film, where at every certain distance both between rows and on the rows a hole is made to leave a free space on the covered surface on which said mat is arranged, in such a way that in said space a plant or a tree is cultivated, and where a series of irrigation pipes are also arranged on or under the mat, where the sprinklers or drippers match with the hole made in the mat wherein the plant is cultivated. An inert substrate is generally placed between rows, as a means of supporting the mat against the surface on which it is placed.

Another field in which land surface covers are used is in the area of household and/or industrial waste management, such as sanitary landfills, where nowadays the world trend is to manage sanitary landfills efficiently and ecologically avoiding the leaching flows produced by waste decomposition, to contaminate the underground layers, as well as the methane or gas produced by waste decomposition collected in piles can be used for the generation of energy. For the implementation of said sanitary landfills, it is necessary to provide a series of impermeable and/or permeable membranes for the handling of the different leached fluids, as well as to be able to also provide resistance to the piles, as well as being equipped with a series of piping in order to add and/or remove air or gas from the batteries, as well as to add and/or remove fluid from the batteries, such as water. Leachates, solutions, among others.

Surface covers as defined and used in the mining area, as well as in agriculture and/or in the management of sanitary and industrial landfills have the shortcoming that they require a large amount of time and labor to arrange both the delivery, distribution and/or removal of fluid system, such as the covers on the surface to be covered which implies an operation that, although it is true, provides a system that allows regulating the conditions of the cover surface, such as evaporation, temperature, humidity, weed control, gas control, air control, fluid removal, among others, however its implementation is expensive due to the labor required for its installation as well as the time involved in its implementation, which also adds the time and skilled labor that is required to implement a monitoring and control system of the surface covered by said mat or film.

The processes for melting plastics by temperature used in the art are well known and widely applied in the state of the art, where most of the known equipment function joining plastic pieces that are conceptually welded when subjected to temperatures at which the plastic material is fused, that is, welding is a process of joining materials, in which the contact surfaces of two or more parts are melted by applying heat, notwithstanding the foregoing, in the art there is no procedure or method that allows the integrated and automatic manufacture of at least one layer, cover, mat and/or film made of polyethylene and/or plastic material whose configuration includes or incorporates in an integrated, attached and/or fixed manner, in a single piece, a fluid delivery, distribution and/or removal system, such as for example at least one irrigation line.

Patent publication EP1430770 A1 teaches a method for manufacturing a combination of mantle and at least one irrigation hose, consisting of a flattened tubular tape, which adheres to the film that forms the mantle on the side that adheres to the soil where it will be applied. It comprises the following steps a) extruding a sheet that forms the film that makes up the mantle; b) extruding a flattened tubular tape; c) perforating a wall of the tubular tape; d) driving the tubular tape and the film along converging paths in consistent directions and at the same speed until they reach a condition in which said tubular tape contacts the film and inserts, downstream of the first contact area, a member of heat protection inside the tubular tape, the protection member of which is a freely movable plate member having a width less than the tubular tape, so that at least one longitudinal side strip or optionally two opposite longitudinal side strips of said tubular tape remain free; e) maintaining the contact condition and the direction and speed of the harmonized drive of the tubular tape and the film; f) welding the tubular member to the film by heating one or all of the side strips of the tubular tape which are not occupied by the protective member, using heating welders to bring them into contact with said free side strips of the tubular tape.

While in the prior art it is possible to visualize systems and methods that, on the one hand, are directed to the manufacture of the mantle with the pipes and, on the other hand, it is possible to visualize systems and methods for the manufacture of pipes with the incorporated drippers, it is not possible to deduce or derive from the state of the art a procedure or method that allows obtaining in a single integrated, automatic and continuous production line, a fluid delivery, distribution and/or removal process with at least one layer, cover, mat and/or film made of polyethylene and/or plastic, in a single piece.

The surfaces covered with said mats or films, as well as fluid conduction lines in the different fields of application analyzed above, are large, for which reason it would be desirable to have a manufacturing or production procedure that allows forming and manufacturing a layer, cover, mat and/or film in a continuous and automatic way, whose configuration includes a fluid delivery, distribution and/or removal system integrated in a single piece into the cover, in such a way that when said cover, layer, mat and/or film is deployed and/or arranged, at the same time a fluid delivery, distribution and/or removal system (air, gas, water, solvents) is deployed, arranged and implemented.

SUMMARY OF THE INVENTION

The primary object of the invention is to provide a production procedure or method that allows to continuously and automatically form and manufacture a layer, cover, mat and/or film, whose configuration includes in a single piece and in an integrated, attached and/or fixed manner, a fluid delivery, distribution and/or removal system incorporated into the cover, so that when said cover, layer, mat and/or film is deployed and/or arranged, at the same time a fluid delivery, distribution and/or removal system is deployed, arranged and implemented.

The present invention provides an automatic, integrated and continuous procedure or method for the production and manufacture in a single piece of at least one layer, cover, mat and/or film made of polyethylene and/or plastic material attached, fixed and/or integrated with at least one element for the delivery, distribution and/or removal of fluid, comprising the basic steps of continuous and automatic feeding of the film, layer, mat and/or cover made of polyethylene and/or plastic, continuous and automatic feeding of at least one element for the delivery, distribution and/or removal of fluid, such as preferably at least one irrigation line, continuous and automatic feeding of at least one sleeve, thermofusion to form a set of said elements in a single piece, and control the parameters of the procedure.

BRIEF DESCRIPTION OF THE FIGURES

In order to help a better understanding of the characteristics of the invention, according to a preferred example of its practical implementation, a set of drawings is attached as an integral part of the description, wherein the invention has been represented with an illustrative and non-limiting nature.

FIG. 1 corresponds to a top view of a scheme showing a production line in which the production process of the present invention is carried out.

PREFERRED EMBODIMENT OF THE INVENTION

The automatic, integrated and continuous procedure for the production and manufacture in a single piece of at least one layer, cover, mat and/or film made of polyethylene and/or plastic material attached, fixed and/or integrated with at least one element for the delivery, distribution and/or removal of fluid, comprises the basic steps of feeding an unfolded polyethylene and/or plastic film, layer, cover, and/or mat (a) to a thermofusion unit (d) including drag idlers whereby the film, layer, mat and/or cover passes, where high-temperature silicone wheels are arranged above said drag idlers, so that they touch said idlers together becoming the means of dragging the film, layer, cover and/or mat which are arranged between said idlers and silicone wheels.

An element for the delivery, distribution and/or removal of fluid, such as, for example, an irrigation line, is fed continuously and automatically from a feeding device (b) that comprises a reel or structure in which said irrigation line is arranged in such a way that said reel is configured to rotate freely according to the thermofusion speed in order to deposit, arrange and/or locate said irrigation line over the film, layer, cover and/or mat that are arranged between said rollers and silicone wheels.

A film sleeve which may be perforated according to a pre-established perforation matrix, is fed from a film sleeve carrier (c) and driven through sleeve guides to arrange and/or place the sleeve on top of the irrigation line already deployed over the film, layer, cover and/or mat that is arranged between said rollers and silicone wheels.

The thermofusion stage consists of heating the zone or area where the silicone wheels are supported by the same action of these, so that the irrigation line is arranged on one side or between adjacent silicone wheels, being fed the film sleeve above the irrigation line, in such a way that part of said sleeve is above the irrigation line and the areas of the peripheral edges of said film sleeve are arranged or placed above the film, layer, cover and/or mat, where said set of elements is dragged by the drag idlers together with the silicone wheels, where at this point a blowing air injector tube is displaced which, when in contact with a heater, heats the air to the predetermined melting temperature that is blown in the area in which the peripheral edges of the film sleeve are arranged above the cover, producing the coupling of the film sleeve with the film, layer, cover and/or mat fusing them together with the pressure produced by the silicone wheels, welding the two plastics, which due to the fact that the silicone wheels are separated from each other, prevent the irrigation line from being thermofused with the fused plastics, remaining grasped, restrained and/or or arranged between the film sleeve and the film, layer, cover and/or mat, thus forming a set of irrigating mantles. Preferably, the system has a plurality of bodies and/or thermofusion units, each one with handles for regulation and movement of the welding matrix, as well as a control system.

Once the plastic, film sleeve and film are fused, it is cooled by means of a cooling device (e) that comprises at least one blower motor connected to air nozzles which perform the cooling, where the air is at room temperature which is necessary to lower the temperature in plastic.

The film feeding step towards the thermofusion unit is carried out by means of a continuous and automatic feeding device for polyethylene and/or plastic film, layer, mat and/or cover that comprises at least one upper axis support and at least one lower axis support for film rolls whose configuration allows the free rotation of the assembled roll and where said feeding device also includes a means to perform axial movements of the roll to correct imperfections in the winding of the polyethylene and/or plastic film, layer, mat and/or cover being fed.

Once the rolls are assembled in the feeding device, the polyethylene and/or plastic film, layer, mat and/or cover is positioned in at least one structure that opens it in a width depending on the predetermined union matrix of the element for the delivery, distribution and/or removal of fluid. The film opening structure is designed and manufactured so that when the film is pulled during its feeding into the system, it can be opened to the maximum extent without major inconveniences.

In an additional stage of the invention procedure, the union of the film that is being fused with at least one other film that is arranged in the feeding device is carried out to maintain the procedure continuously, which is carried out by means of a welder which is in charge of fusing the film that is ending with the film that is beginning in the process, in such a way that the two ends are joined in the welder. This stage is started by means of a sensor that activates a siren warning of the end of the film, proceeding to heat the resistances. Once heated, a cylinder holder structure automatically moves downwards through cylinders that exert sufficient pressure to stick both plastics through the temperature of the resistance.

A ballast element or means can be attached to the polyethylene and/or plastic film, layer, mat and/or cover, which is fed from a carrier of said ballast element or means that is preferably arranged on the side and beginning of the opening structure, where preferably they may be blind hoses or layflats among other ballast means.

The product formed as previously described, that is to say, the set of layer, cover, mat and/or film made of polyethylene and/or plastic material attached to the element for the delivery, distribution and/or removal of fluid is driven to a quality control and cutting counter by means of the film sleeve (f), where by means of a drag device with acrylic wheels and a idler that rotates at the speed of thermofusion through a drive chain, allow to maintain the tension between the cutting and the thermofusion machine. In this table is where the operator(s) verifies that the welding of the plastics is correct and uniform, it is also where they carry out repairs and patches due to imperfections that can occur both in the film and in the irrigation lines, for this purpose he counts with a transfer platform and a repair platform. A cutting device is located after the drive wheels and is composed of a cutting saw and a motor that allows the cutting saw to be moved from end to end to cut the finished product to a predetermined length. After the cutting saw, there is an arch with three blowers which are the second stage of cooling to ensure the cooling of the product.

The finished product is rolled into a donut-type format for packaging using a rewinding equipment (g), which once rolled is strapped and removed from the equipment.

The procedure of the present invention allows films that vary in thickness ranging from 50 microns to 200 microns to be fused together, preferably, with melting temperature ranges ranging from 300 to 700° C., preferably, with air flows that go up to approximately 134 liters per minute and with production speeds of the process feeding that go up to 25 meters per minute, where these parameters are adjusted according to the predetermined parameters, depending on the product to be manufactured which is carried out through an automated control system, in which the conditions required for each type of product matrix to be produced are entered.

APPLICATION EXAMPLE

In a production line, at least one roll of 120 microns low-density plastic film with a width of 5.5 m with UV protection, was arranged in a feeding device, the roll was fed and unfolded to be fed to a thermofusion device, and on said film 10 irrigation lines were fed with incorporated drippers of low density of 1 mm thickness with drippers arranged every 0.5 meters longitudinally in each line and on said line of drippers a low-density polyethylene sleeve of 110 microns, 10.5 cm wide with a percentage of UV protection with a perforation pattern of 3 perforations every 3.5 cm, and a smooth hose ballast of low-density, 0.8 cm thick and 16 mm in diameter on one edge of the film and on the other edge of the film a layflat was fed. The feeding speed of all the elements and thermofusion was 14 m/min with a thermofusion temperature of 500° C. with a hot air flow of 7 bars, and a cold air blower at room temperature.

As a result, it was obtained an irrigating mantle for leach pads of 5.5 meters wide with 10 irrigation lines with drippers and 81 meters long with ballasts on its edges, which was subjected to detachment tests not producing the detached of the sleeves from the film, holding the drip lines between them safely.

In this way, an irrigation mantle set for mineral leaching piles was configured which allowed a cover and drip irrigation lines to be deployed together, thus reducing the implementation time of a leaching pile with drip irrigation lines and a plastic cover in at least 50% of the time used in the technique and with a reduction in personnel of at least 50%, maintaining an even distribution of irrigation in the pile, reducing by more than 90% water consumption, improving leaching by increasing the leaching temperature in the heap making the process more efficient.

The invention claimed is:

1. An automatic and integrated procedure for the continuous manufacture of a film made of polyethylene and/or plastic material, wherein the film includes at least one irrigation line integrated to the film, such that a manufactured product allows the film and the irrigation line to be deployed at the same time, the procedure including the steps of:
   a) feeding an unfolded film to a thermofusion unit comprising drag idlers through which the film passes, where silicone wheels are arranged above said drag idlers, so that they the silicone wheels touch the drag idlers and together drag the film and arrange it between the drag idlers and silicone wheels,
   b) continuously and automatically feeding the at least one irrigation line, arranging said at least one irrigation line on top of the film,
   c) feeding a film sleeve having a predetermined perforation pattern, the film sleeve being arranged over the at least one irrigation line and over the film,
   d) thermofusing peripheral edges of the film sleeve to the film using pressure by the silicone wheels, so as to weld the film sleeve and film together while leaving the at least one irrigation line; unbonded and retained between the film sleeve and the film.

2. The procedure according to claim 1, wherein feeding the film towards the thermofusion unit is carried out by a continuous and automatic film feeding device comprising at least one upper axis support and at least one lower axis support for film rolls, wherein the film feeding device is configured to allow free rotation of at least one film roll, and wherein said at least one upper axis support and at least one lower axis support are configured to allow axial movements of the film roll to correct imperfections in the winding of the film that is being fed.

3. The procedure according to claim 1, further comprising unfolding a roll of film, mounted on a continuous and automatic film feeding device by a reel configured to unfold the roll of film in a width depending on a predetermined union matrix of the at least one irrigation line.

4. The procedure according to claim 1, further comprising heating a area of the film where the silicone wheels are supported, wherein the beating is performed by the silicone wheels.

5. The procedure according to claim 1, further comprising arranging the at least one irrigation line; beside or between adjacent silicone wheels.

6. The procedure according to claim 1, further comprising feeding the film sleeve over the at least one irrigation line, in such a way that part of said film sleeve remains over the at least one irrigation line, and areas of the peripheral edges of said film sleeve are arranged on the film.

7. The procedure according to claim 1, wherein the at least one irrigation line is fed continuously and automatically from a continuous and automatic feeding device comprising a reel configured to rotate freely according to a thermofusion speed.

8. The procedure according to claim 1, wherein the film sleeve is fed from a carrier and conducted through sleeve guides.

9. The procedure according to claim 1, further comprising displacing a blown air injector tube that when in contact with a heater, heats the blown air at a predetermined melting temperature that is blown in an area where the peripheral edges of the film sleeve contact the cover film.

10. The procedure according to claim 1, further comprising arranging a ballast element to the film.

11. The procedure according to claim 1, further comprising cooling the film after the thermofusing step.

12. The procedure according to claim 1, further comprising joining the film with at least one other film arranged in a continuous and automatic film feeding device to maintain the procedure continuously.

13. The procedure according to claim 1, further comprising rolling the film after manufacture into a donut format for packaging.

14. The procedure according to claim 1, wherein the film and/or the film sleeve has a variation in thickness ranging from 50 microns to 200 microns.

15. The procedure according to claim 1, wherein a melting temperature of the film and/or film sleeve ranges between 300 to 700° C.

16. The procedure according to claim 1, wherein the feeding and production speeds are up to 25 meters per minute.

17. The procedure according to claim 1, wherein the perforation pattern of the film sleeve comprises a plurality of perforations spaced apart along a longitudinal axis.

* * * * *